US007576719B2

(12) United States Patent
Huang

(10) Patent No.: US 7,576,719 B2
(45) Date of Patent: Aug. 18, 2009

(54) DISPLAY CAPABLE OF DISPLAYING MULTI-COLOR SPACE

(75) Inventor: Jih-Fon Huang, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 369 days.

(21) Appl. No.: 11/681,185

(22) Filed: Mar. 2, 2007

(65) Prior Publication Data

US 2008/0129661 A1 Jun. 5, 2008

(30) Foreign Application Priority Data

Nov. 30, 2006 (TW) .................................. 95144429

(51) Int. Cl.

| | |
|---|---|
| ***G09G 3/32*** | (2006.01) |
| ***G09G 3/36*** | (2006.01) |
| ***G09G 1/28*** | (2006.01) |
| ***G02F 1/00*** | (2006.01) |
| ***H04N 5/70*** | (2006.01) |
| ***A62B 1/04*** | (2006.01) |

(52) U.S. Cl. ......................... 345/83; 345/589; 345/591; 345/22; 348/68; 348/751; 348/801

(58) Field of Classification Search ............. 348/68–71, 348/101, 557, 560, 742–744, 751, 563, 760–761, 348/801–803; 345/83–88, 22, 38–39, 42, 345/46, 77, 589, 591, 593, 597

See application file for complete search history.

(56) References Cited

U.S. PATENT DOCUMENTS

| | | | | |
|---|---|---|---|---|
| 5,243,414 | A * | 9/1993 | Dalrymple et al. | 358/500 |
| 6,151,004 | A | 11/2000 | Kaneko | |
| 7,135,664 | B2 * | 11/2006 | Vornsand et al. | 250/205 |
| 2002/0005829 | A1 | 1/2002 | Ouchi | |
| 2002/0080304 | A1 | 6/2002 | Ho et al. | |
| 2003/0185302 | A1 * | 10/2003 | Abrams, Jr. | 375/240.12 |
| 2003/0234911 | A1 | 12/2003 | Horvath et al. | |
| 2007/0189026 | A1 * | 8/2007 | Chemel et al. | 362/458 |

FOREIGN PATENT DOCUMENTS

| | | |
|---|---|---|
| WO | 2006066380 | 6/2006 |

OTHER PUBLICATIONS

"1st Office Action of China counterpart application", issued on Apr. 10, 2009, p. 1-p. 5.

* cited by examiner

*Primary Examiner*—Wesner Sajous
(74) *Attorney, Agent, or Firm*—Jianq Chyun IP Office

(57) ABSTRACT

A display capable of displaying multi-color space and including a display unit, a control circuit, and a light source is provided. The control circuit is electrically connected to the display unit and the light source respectively. In addition, the light source is controlled by the control circuit to switch between different illumination modes, such that the display is capable of displaying multi-color space with different specifications, for example, sRGB, NTSC, SMPTE, PAL, etc.

11 Claims, 7 Drawing Sheets

DISPLAY CAPABLE OF DISPLAYING MULTI-COLOR SPACE

CROSS-REFERENCE TO RELATED APPLICATION

This application claims the priority benefit of Taiwan application Ser. No. 95144429, filed on Nov. 30, 2006. All disclosure of the Taiwan application is incorporated herein by reference.

BACKGROUND OF THE INVENTION

1. Field of the Invention

The present invention relates to a display. More particularly, the present invention relates to a display capable of displaying multi-color space with different specifications.

2. Description of Related Art

In chromatics, XYZ usually indicate colors. Generally speaking, XZ are not used to represent color space. XZ are converted into the form of xy first, and the xy are used to indicate the color space.

$$x=X/(X+Y+Z) \quad (1)$$

$$y=Y/(X+Y+Z) \quad (2)$$

The XYZ coordinates may be quickly converted into xy coordinates according to formulas (1) and (2).

FIG. 8 is a color space diagram constituted by the Commission Internation De'l E'clairage in 1931. In FIG. 8, (x, y) coordinates are color space coordinates of any color, which may be gray, yellow, coffee, or brown. In a triangle formed by three primary colors on the color space coordinates, for example, the triangle enclosed by red, green, and blue, the internal area is the range of colors that the display can render, that is, the color space displayed by the display. In addition, the larger the triangle area is, the wider the color space is, and the more vivid the color is represented.

In most of the information equipments, the display is used as a major communication interface. However, in the design of the display, only one color space of sRGB, NTSC, SMPTE, and PAL is included, and it is impossible to switch between the color spaces with different specifications. Thus, it is inconvenient for users. For example, when the user intends to print a picture seen on the display, after being printed by the printer, it is found that the color of the printed picture is distinctly different from that of the display image. Since the color space of the printer is set to sRGB, but the display is not set to this color space, the distortion is generated.

In addition, in 2006, a paper entitled "Field-sequential-colour display with adaptive gamut" is issued by Johan Bergquist et al. in the society for information display (SID), in which an idea of regulating the range of the color space of the display according to the minimum color space required by the display image. However, it is just mentioned in this paper that the color space may be enlarged or reduced, and the scale range is not distinctly provided.

SUMMARY OF THE INVENTION

Accordingly, the present invention is directed to provide a display which is capable of displaying multi-color space with different specifications, such as sRGB, NTSC, SMPTE, and PAL.

The present invention provides a display, which comprises a display unit, a control unit, and a light source. The control circuit is electrically connected to the display unit. The light source is electrically connected to the control circuit, and the control circuit is suitable for controlling the light source to switch between a plurality of illumination modes, such that the display unit may display multi-color space with different specifications. In addition, the color space of the light source covers the multi-color space with different specifications, such as sRGB, NTSC, SMPTE, and PAL.

Since the display of the present invention may display multi-color space with different specifications, such as sRGB, NTSC, SMPTE, and PAL. When the display switching between the color spaces with different specifications, no color distortion is generated. Therefore, the display of the present invention can switch to the required color space according to the requirement of the user. Thus, not only the function of the display is expanded, but also the convenience in use is improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
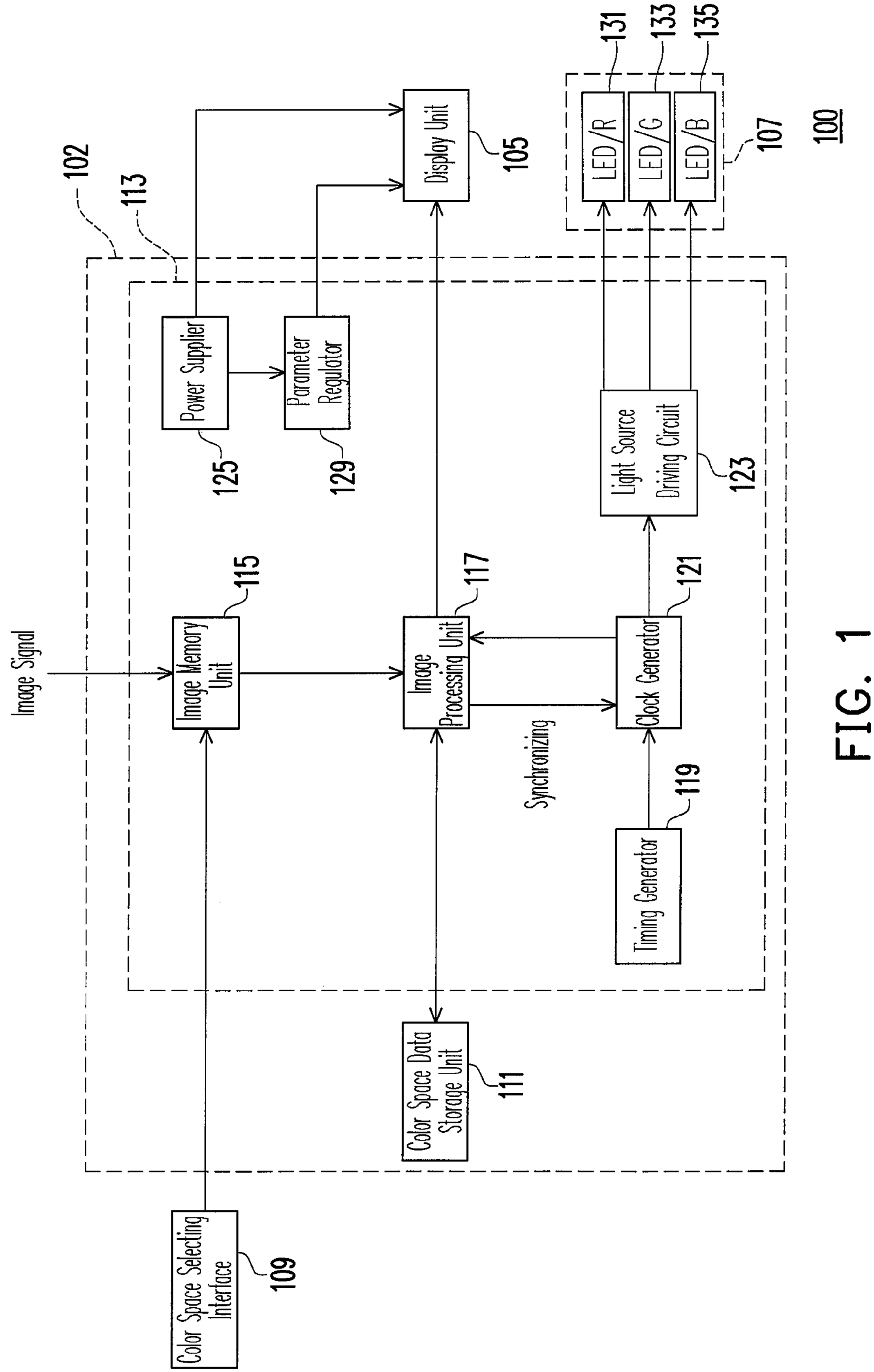
FIG. 1 shows a display according to a preferred embodiment of the present invention.

FIG. 1 shows a display according to a preferred embodiment of the present invention. Referring to FIG. 1, the display 100 includes a control circuit 102, a display unit 105, and a light source 107. The control circuit 102 is electrically connected to the display unit 105 and the light source 107 respectively, and the control circuit 102 transmits a control signal to the light source 107, thereby controlling the light source 107 to switch between a plurality of illumination modes, such that the display unit 105 is capable of displaying multi-color space with different specifications in the color space covered by the light source 107.

In addition, the display unit 105 may be an LCD panel or an image projection unit. The displayed color space specifications may include sRGB, NTSC, SMPTE, and PAL etc. In a preferred embodiment of the present invention, the color space specifications of the display 100 include at least two of the above mentioned specifications. However, in order to make the image displayed by the display unit 105 to meet the color space specifications, the light source 107 with high color saturation, for example, carbon nanotube, light emitting diode (LED), laser and plasma plane light source may be used. The light source 107 of this embodiment is a plurality of LEDs which includes a red LED 131, a green LED 133, and a blue LED 135.

The display 100 of this embodiment further includes a color space selection interface 109 electrically connected to the control circuit 102. In addition, the color space selection interface 109 is, for example, an on-screen display (OSD) interface, thereby the user may use the OSD interface to switch the color space displayed by the display 100.

Referring to FIG. 1, the control circuit 102 may further include a color space data storage unit 111 and a driving unit 113. The color space data storage unit 111 is electrically connected to the driving unit 113, and the color space data storage unit 111 stores the multi-color space with different specifications for the driving unit 113 to read.

The driving unit 113 includes an image memory unit 115, an image processing unit 117, a timing generator 119, a clock generator 121, and a light source driving circuit 123. The image memory unit 115 is used to receive an image signal, and transmits it to the image processing unit 117. The image processing unit 117 transmits the image data to the display unit 105 and further transmits a synchronizing signal to the clock generating circuit 121. In addition, when the timing generator 119 enables the clock generator 121, the clock generator 121 may transmit a clock control signal to the light source driving circuit 123, thereby driving the light source 107.

In addition, the driving unit 113 further includes a power supply 125 and a parameter regulator 129. The power supply 125 is used to provide the power source for the operation of the LCD panel, and the parameter regulator 129 is used to regulate the brightness of the LCD panel.

Figure 2:
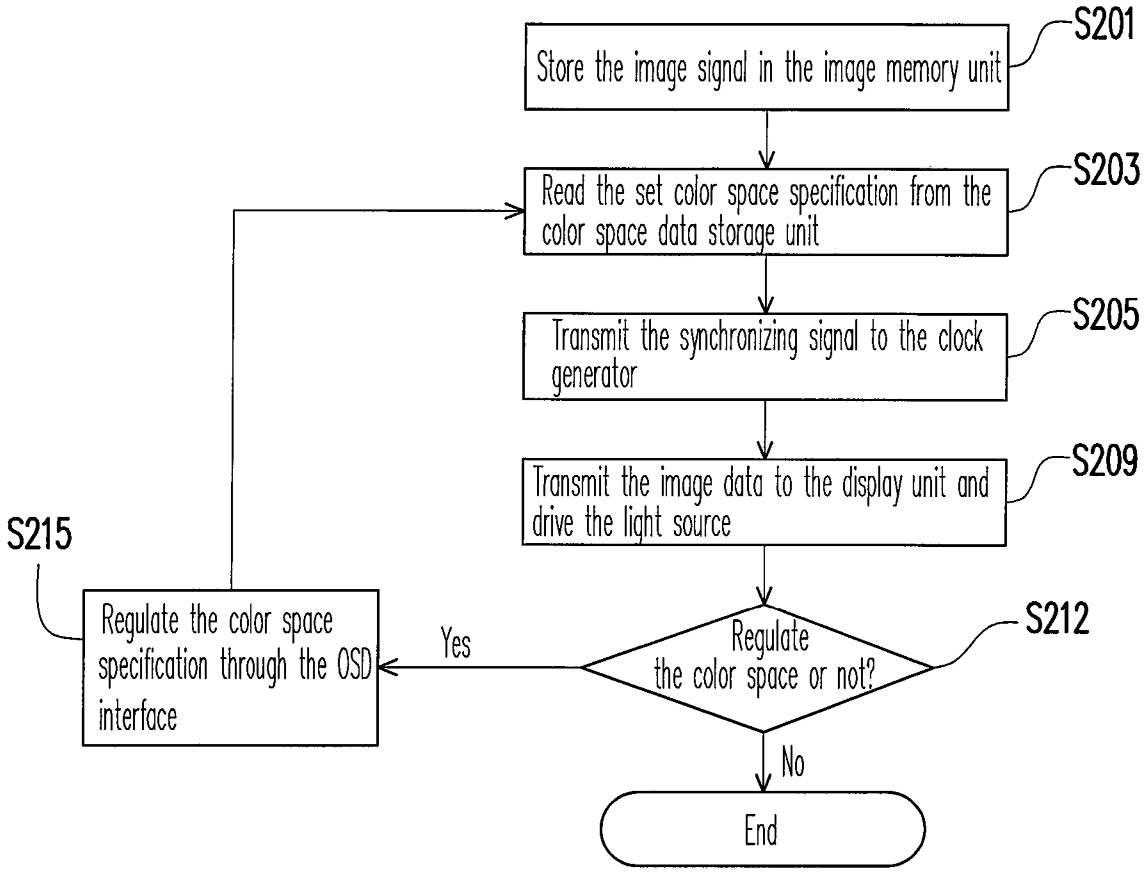
FIG. 2 shows steps of controlling a display according to a preferred embodiment of the present invention.

FIG. 2 shows steps of controlling a display according to a preferred embodiment of the present invention. Referring to FIG. 1 and 2, when an image data is input, the display 100 stores it to the image memory unit 115 (S201). The image data may be input from the signal source with different color space specifications of cable televisions, digital video discs (DVDs), or personal computers. Next, the image memory unit 115 may transmit the image data to the image processing unit 117. If the user does not set the color space specification of the display 100, the image processing unit 117 reads the default value (S203) of the color space from the color space data storage unit 111 first.

After reading the color space specification, the image processing unit 117 transmits a synchronizing signal to the clock generator 121 (S205). At this time, if the clock generator 121 receives the enabling signal of the timing generator 119, the clock generator 121 transmits a clock control signal to the image processing unit 117 and the light source driving circuit 123 respectively. When the image processing unit 117 receives the clock control signal transmitted by the clock generator 121, the image processing unit 117 transmits the image data to the LCD panel, so as to drive the LCD panel to display image. In addition, when the light source driving circuit 123 receives the clock control signal transmitted by the clock generator 121, the light source driving circuit 123 generates a driving signal to the light source 107, such that each LED in the light source 107 provides the required brightness according to the driving signal (S209). Therefore, the display 100 of this embodiment may display the received image data accurately.

When the image displayed by the LCD panel meets the requirements of the user, the regulation is not required (S212). Relatively, when the user intends to regulate the color space of the display image, the user may use the OSD interface to select a new color space (S215).

The present invention is characteristized in that the display 100 may convert between color spaces with different specifications without generating color distortion. It is described how the light source driving circuit 123 drives each light source, so as to switch between the color spaces of the display image below.

Figure 3:
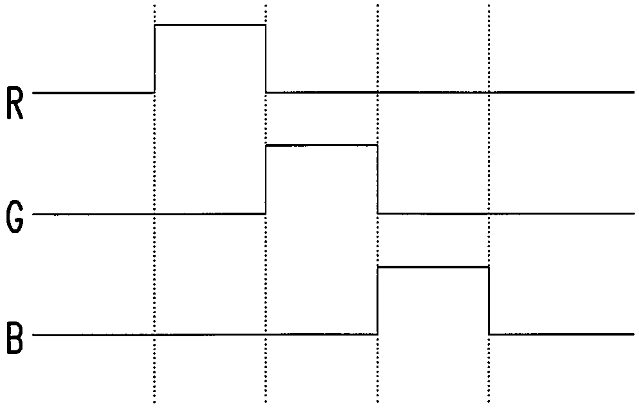
FIG. 3 shows a conventional light source driving method.

FIG. 3 shows a conventional light source driving method. Referring to FIG. 3, the conventional light source driving method relates sequentially driving the red (R) LED, the green (G) LED, and the blue (B) LED, and only drives one LED in a same time interval. In addition, the total driving time of the three LEDs is a frame time of one image.

Figure 4:
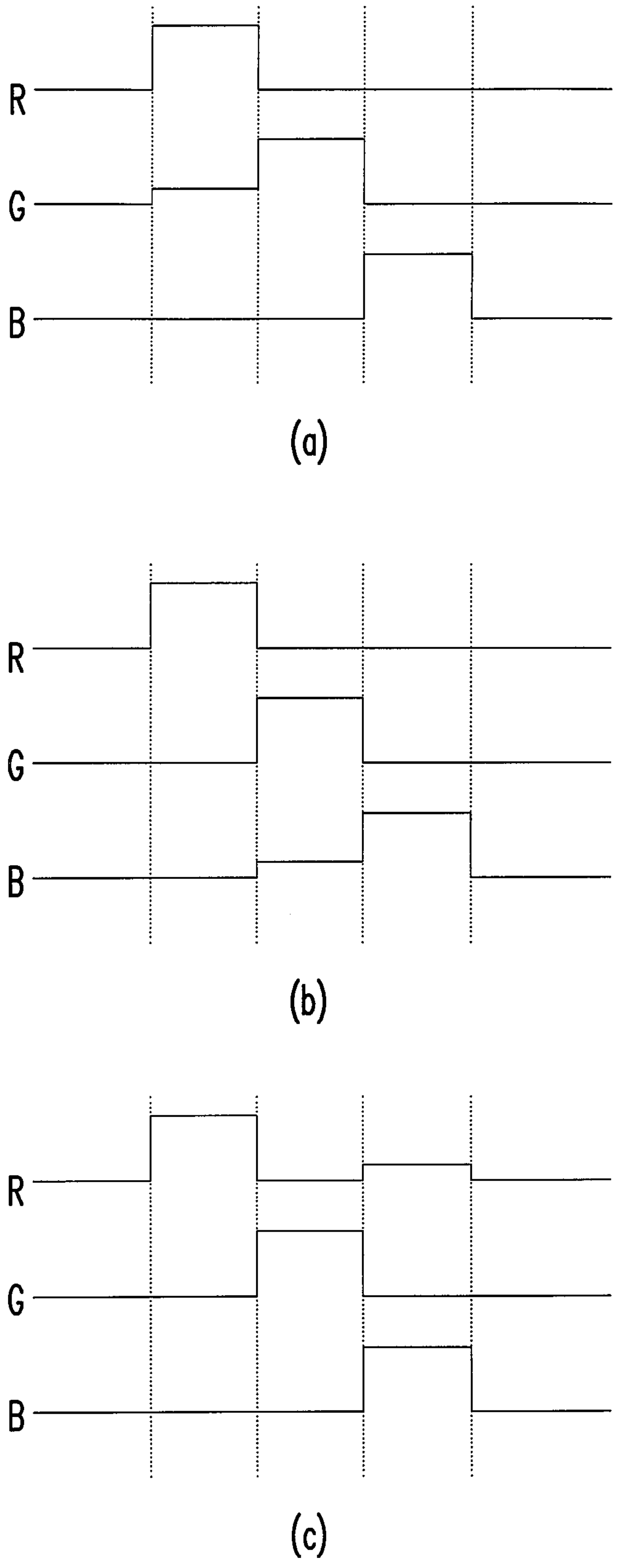
FIG. 4(*a*) to 4(*c*) show a light source driving method according to a preferred embodiment of the present invention.

Part (a) of FIG. (4) is a light source driving method according to a preferred embodiment of the present invention. In FIG. 4, as compared with the conventional method, the main difference lies in that when the red (R) LED is fully driven, the green (G) LED is driven simultaneously. The luminous brightness of the green (G) LED is not required to be the maximum value. Due to the color mixing effect, the color saturation of red is reduced, so that in the chromatic coordinates, the reddest coordinates may offset to left, and the range of color space is reduced.

Similarly, in Parts (b) and (c) of FIG. 4, in this embodiment, due to the color mixing effect, the color saturation of green and blue are reduced, and the range of color space is reduced. In addition, those skilled in the art should know that if it is intended to regulate the color saturation of two colors simultaneously, the method may still be used.

Figure 5:
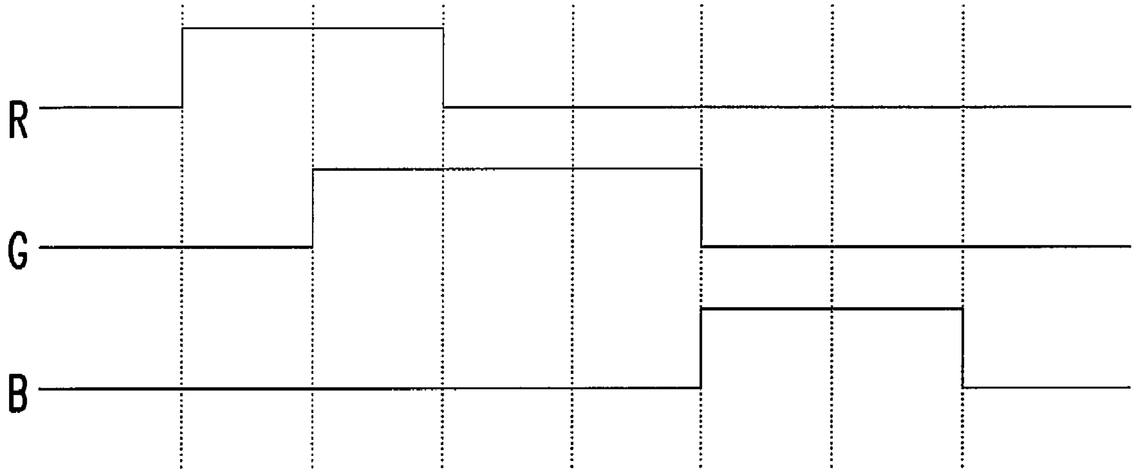
FIG. 5 shows another light source driving method according to the present invention.

FIG. 5 shows a light source driving method according to another embodiment of the present invention. Referring to FIG. 5, firstly, the red (R) LED is fully driven, when the red (R) LED is driven to a preset time (usually smaller than a light emitting cycle), the green (G) LED is fully driven. Due to the color mixing effect, the color saturation of red is reduced, the range of color space is reduced. In addition, those skilled in the art may use the above method to reduce the color saturation of another color.

Figure 6:
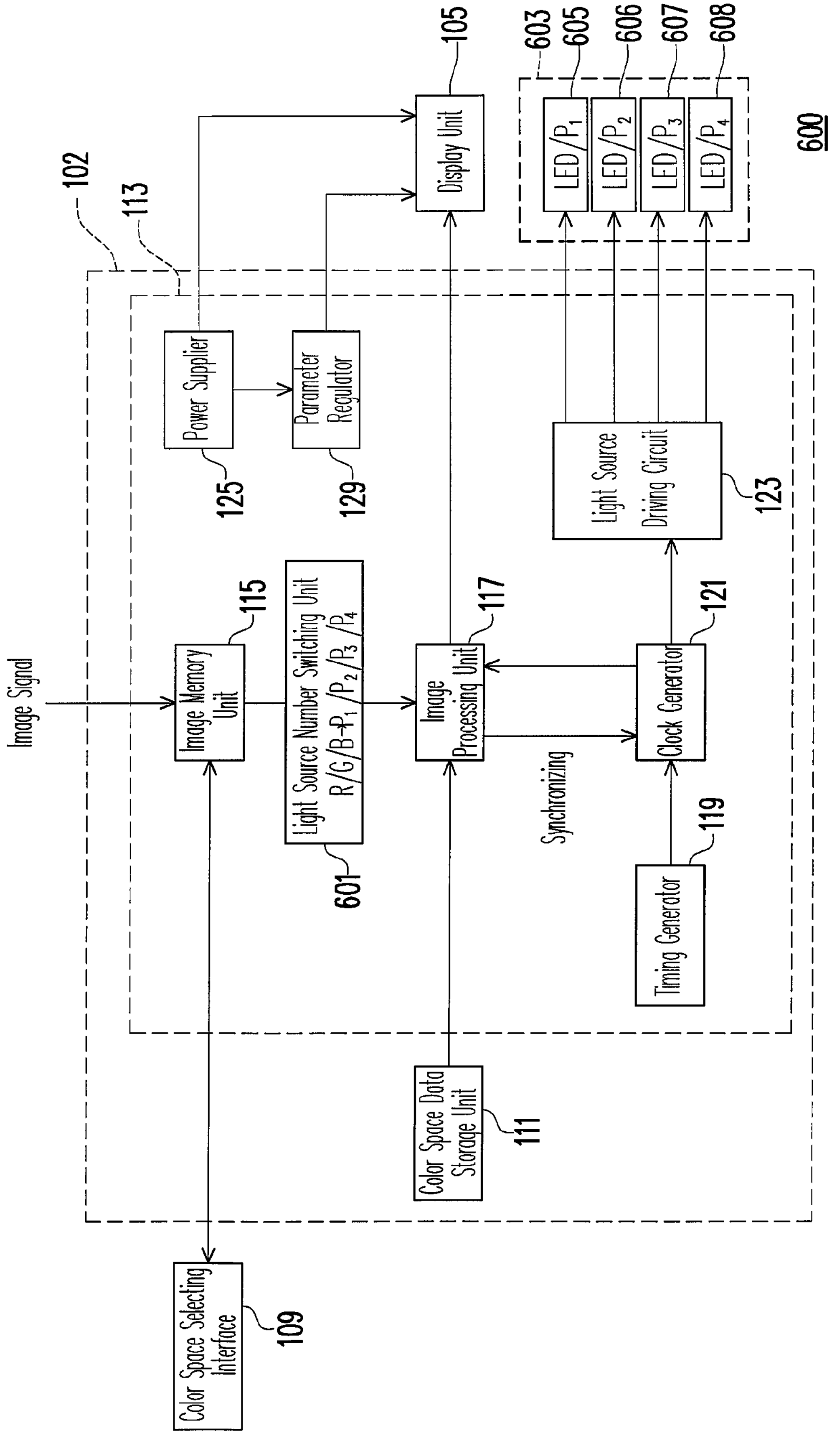
FIG. 6 shows another display according to the present invention.

FIG. 6 shows another display according to the present invention. Referring to FIG. 6, the display 600 of this embodiment is similar to that of the first embodiment, except that the light source 603 of the display 600 of this embodiment includes four LEDs 605, 606, 607, and 608. In this embodiment, the LED 605 is, for example, a red LED, the LED 606 is, for example, a first green LED, the LED 607 is, for example, a second green LED, and the LED 605 is, for example, a blue LED 608. In addition, the display 600 of this embodiment may further include a light source number switching unit 601 electrically connected between the image memory unit 115 and the image processing unit 117 for determining the quantity of the light source 603 to be driven. Particularly, although the quantity of the LEDs in the display 600 is four, the display 600 may still determine the quantity of the LEDs to be driven through the light source number switching unit 601.

Since four LEDs capable of emitting different wavelengths respectively are used in this embodiment, the maximum color space range displayed by the display 600 may be effectively enlarged.

Figure 7:
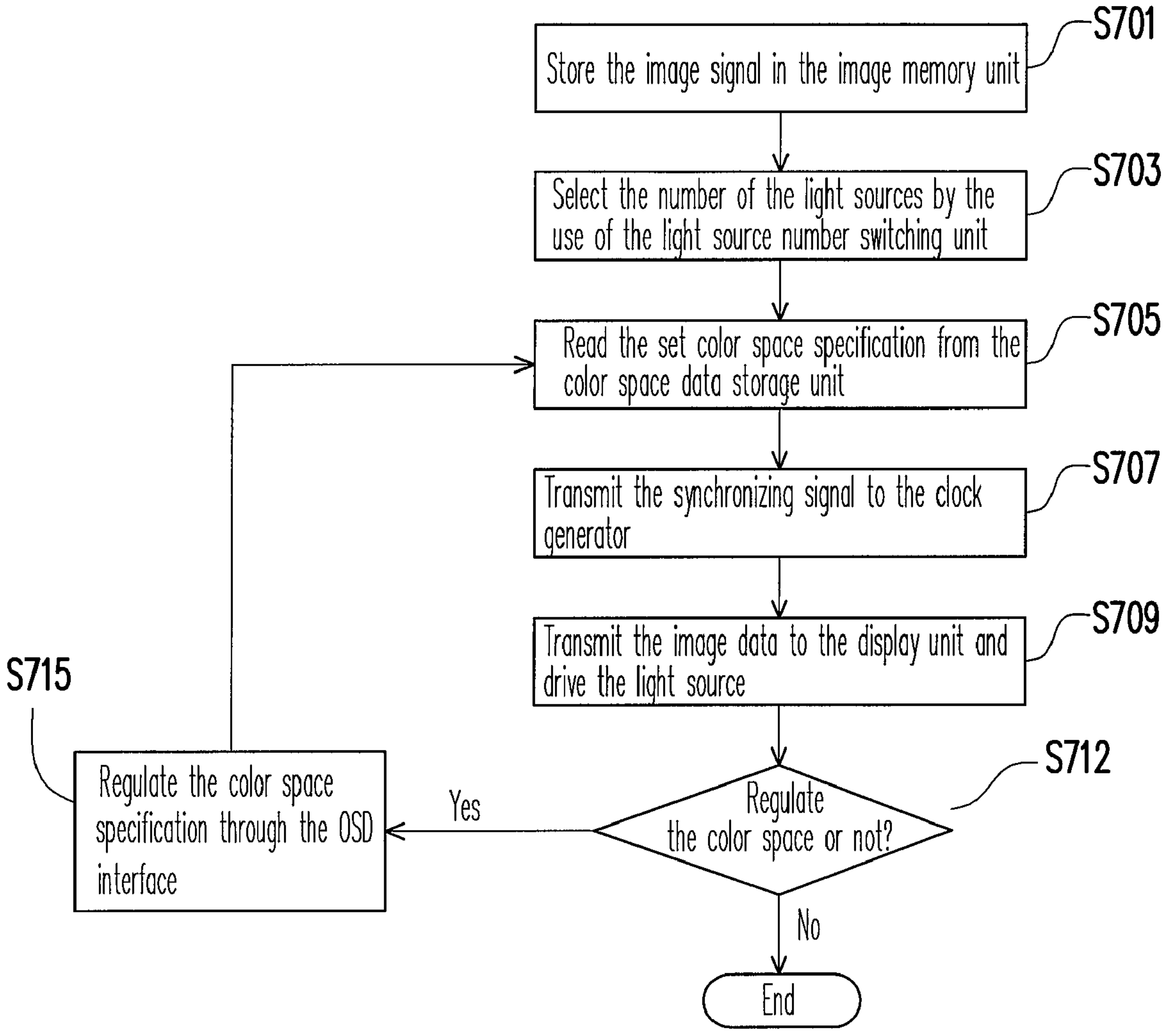
FIG. 7 shows steps of controlling another display according to the present invention.
Figure 8:
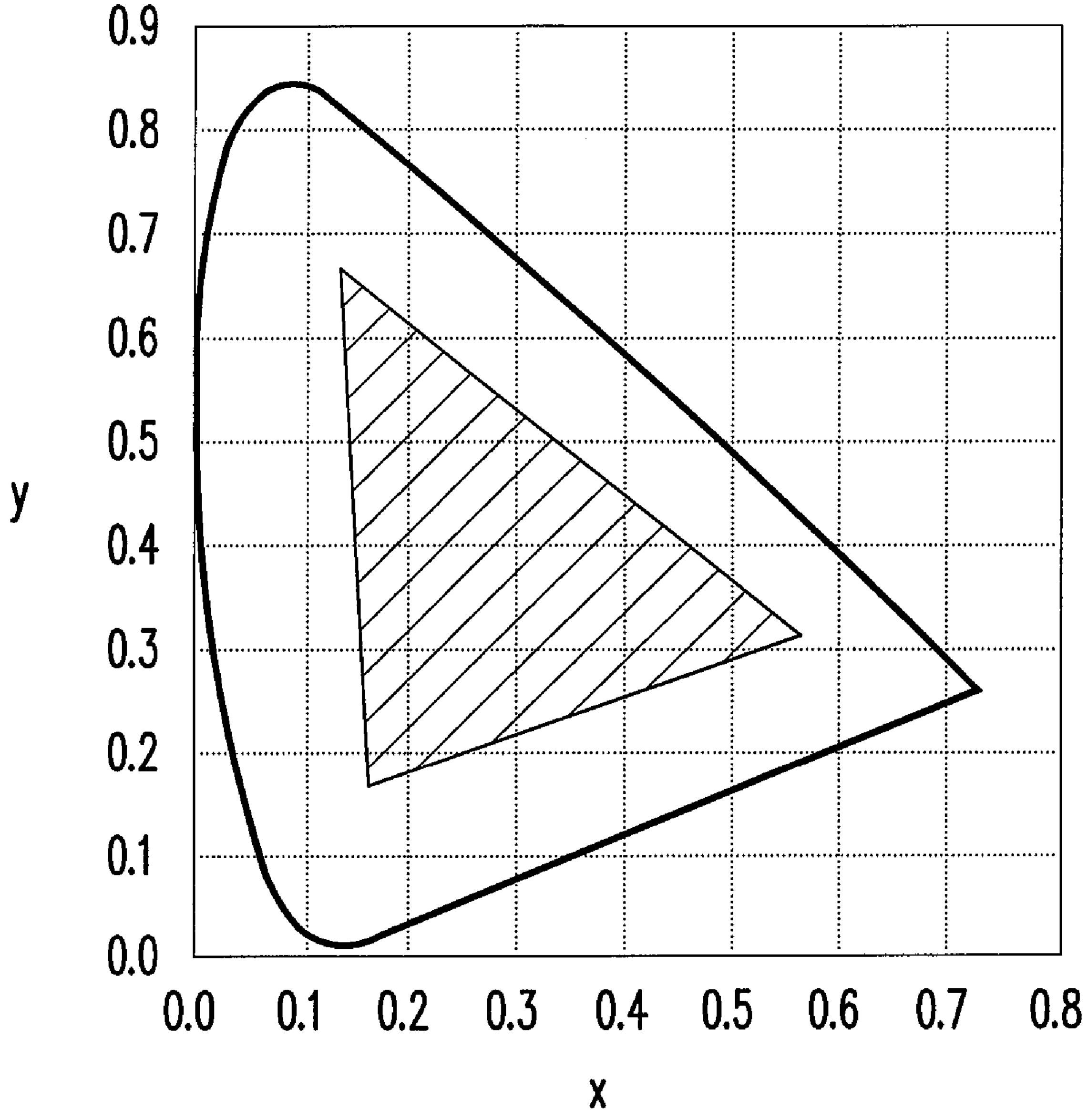
FIG. 8 is a color space diagram constituted by the Commission Internation De'l E'clairage in 1931.

FIG. 7 shows steps of controlling another display according to the present invention. Referring to FIGS. 6 and 7 together, when the display 600 receives an image signal, the display 600 stores the image data in the image memory unit 115 (S701). Next, as described in step S703, the user may set the number of the LED through the light source number switching unit 601, and a signal is then transmitted to the image processing unit 117. Moreover, steps S705 to S715 are similar to steps S203 to S215 of FIG. 2, so the details are not described herein again.

In addition, since the color space of the light source in the present invention is larger than the specifications such as sRGB, NTSC, SMPTE, and PAL etc. Therefore, in this embodiment, the light emitted by various LEDs of primary colors has high color saturation. Generally, an LED package has an encapsulant. In order to make the light emitted by the LEDs have high color saturation, in this embodiment, a color saturation enhancement coating of corresponding color is disposed on each LED encapsulant respectively, such that each LED may emit the light with high color saturation.

In another embodiment of the present invention, in order to make the light emitted by the LEDs have high color saturation, a color saturation enhancement dopant is doped in each LED encapsulant respectively, such that each LED may emit the light with high color saturation.

To sum up, the display of the present invention is capable of switching between multi-color space with different specifications without generating color distortion. In addition, the light source of the present invention has high saturation, and the chromaticity covers sRGB, NTSC, SMPTE, and PAL etc, such that the display may display multi-color space with different specifications.

It will be apparent to those skilled in the art that various modifications and variations may be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display capable of displaying multi-color space, comprising:

a display unit;

a control circuit, electrically connected to a display unit; and a light source, electrically connected to the control circuit, wherein the light source is controlled by the control circuit to switch between a plurality of illumination modes, such that the display unit is capable of displaying the multi-color space with different specifications, and the color space of the light source covers the color spaces with different specifications.

2. The display as claimed in claim 1, wherein the display unit comprises a liquid crystal display panel or an image projection unit.

3. The display as claimed in claim 1, wherein the control circuit comprises:

a driving unit, electrically connected to the display unit and the light source, so as to control the image displayed by the display unit and an illumination mode of the light source; and a color space data storage unit, electrically connected to the driving unit, wherein the color space data storage unit is used to store the illumination modes corresponding to the color spaces with different specifications.

4. The display as claimed in claim 1, further comprising a color space selection interface electrically connected to the control circuit.

5. The display as claimed in claim 4, wherein the color space selection interface comprises an on-screen display (OSD) interface.

6. The display as claimed in claim 1, wherein the color spaces with different specifications comprise at least two color spaces of sRGB, NTSC, SMPTE, and PAL.

7. The display as claimed in claim 1, wherein the light source comprises a plurality of light emitting diodes (LEDs), and the LEDs comprise a plurality of LEDs with different primary colors.

8. The display as claimed in claim 7, wherein the LEDs comprise a red LED, a green LED, and a blue LED.

9. The display as claimed in claim 7, wherein the LEDs comprise a red LED, a first green LED, a second green LED, and a blue LED.

10. The display as claimed in claim 7, wherein each LED comprises:

an LED package, having a encapsulant; and a color saturation enhancement coating, disposed on a surface of the encapsulant.

11. The display as claimed in claim 7, wherein each LED comprises:

an LED package, having an encapsulant; and a color saturation enhancement dopant, doped in the encapsulant.

* * * * *